Sept. 8, 1953     B. N. ASHTON ET AL     2,651,491
SHUTTLE VALVE
Filed June 12, 1951
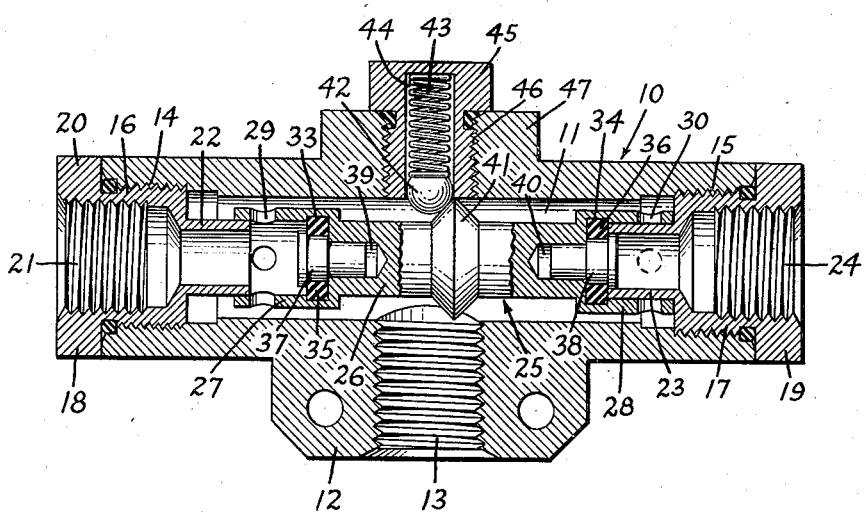
INVENTORS.
BENJAMIN N. ASHTON
JOHN P. FRAIN
EMERSON S. RAWDING
BY
THEIR ATTORNEYS.

Patented Sept. 8, 1953

2,651,491

UNITED STATES PATENT OFFICE 2,651,491

SHUTTLE VALVE

Benjamin N. Ashton, John P. Frain, and Emerson S. Rawding, Kingston, N. Y., assignors to Electrol Incorporated, Kingston, N. Y., a corporation of Delaware Application June 12, 1951, Serial No. 231,176

6 Claims. (Cl. 251—118)

This invention relates to improvements in shuttle valves of the type used to connect different sources of liquid and gaseous pressure alternately to hydraulic systems to actuate hydraulic motors and the like in the system.

As disclosed in the Ashton Patent No. 2,445,505, dated July 20, 1950 and the Ashton U. S. application Serial No. 780,259 filed October 16, 1947, now Patent No. 2,569,967, shuttle valves have been provided heretofore for use in the hydraulic systems of aircraft and the like. The shuttle valve is interposed between the pump to supply pressure to the hydraulic system and an auxiliary source of pressure, such as a bottle of compressed gas whereby if the pump is damaged, the shuttle valve will operate automatically to connect the gas bottle to the system to permit operation of the system by gas pressure.

The valves disclosed in the above-mentioned patents are satisfactory for the purposes described therein but are more complicated and more expensive than might be desired.

The present invention provides a shuttle type valve of simplified structure which is highly effective to connect the two sources of pressure selectively to a hydraulic system. The valve is especially effective in preventing mixing of the fluids from the two sources of pressure under all conditions of operation. Moreover, the improved form of shuttle valve involves new structural relationships whereby the machining operations and the procedural steps involved in the production of the valve are greatly simplified.

For a better understanding of the present invention, reference may be had to the accompanying drawing in which the single figure is a view in longitudinal section through a typical shuttle valve embodying the present invention.

As shown in the drawing, the valve includes a casing 10 which may be of cylindrical or other exterior shape and is provided with a generally cylindrical bore 11 extending lengthwise of the casing. The casing 10 is further provided with an offset boss 12 at about the middle of the casing through which is drilled the discharge port 13 communicating with the bore 11 at about its middle. The opposite ends of the casing 10 are provided with the threads 14 and 15 which engage the exteriorly threaded portions 16 and 17, respectively, of the pressure port couplings 18 and 19. The couplings 18 and 19 are essentially the same and are interchangeable in the valve structure. Each of the couplings, for example, the coupling 18 has at the outer end of the threaded portion 16 a hexagonal or non-circular head 20 by means of which the coupling 18 can be screwed into the end of the casing. The member 18 is provided with a central bore 21 forming the inlet port through which liquid or gas under pressure is introduced into the bore 11. At the inner end of the threaded portion 16 is a sleeve 22 which forms one element of a slide valve, described hereinafter. The sleeve 22 has its outer surface spaced radially from the inner wall of the casing 10 to provide space to receive the cooperating element of the slide valve.

The coupling 19 is provided with a similar sleeve 23 and an inlet or pressure port 24.

Mounted within the bore or chamber 11 is an elongated valve plug 25 having a central portion or stem 26 of substantially smaller cross-sectional area than the cross-sectional area of the bore 11. The cross-sectional shape of the stem 26 of the plug is not very important but may be of circular shape. At opposite ends of the stem 26 are generally cup-shaped sleeve valve elements 27 and 28 which telescopically receive the sleeves 22 and 23, respectively. The over-all length of the valve member 25 is such that the sleeve members 22 and 27 and the sleeve members 23 and 28 are always in telescopic relation regardless of the position of the valve member 25. For that reason, the valve member 25 is positively guided and held in centered relation to the valve casing and additional guide means for the valve are completely eliminated.

The sleeves 27 and 28 are provided with radial passages 29 and 30 near their outer ends which permit the flow of liquid through the couplings 18 and 19 into the bore or chamber 11 and out through the outlet port 13 depending upon which of the passages 29 and 30 is uncovered. As illustrated in the drawing, when the valve member 25 is in its extreme right-hand position, the ports 29 are disposed inwardly of the end of the sleeve so that fluid can flow through the port 21, the sleeve 22, the passages 29, the bore or chamber 11 and out through the outlet port 13.

Liquid cannot flow through the coupling 19 because the passages 30 in the sleeve 28 are covered by the sleeve 23.

The spacing between the passages 29 and 30 and the spacing between the inner ends of the sleeves 22 and 23 are related so that one of the sets of passages 29 and 30 is covered before the other set is uncovered by sliding movement of the valve member 25. In the intermediate position of the valve 25 both of the sets of passages 29 and 30 are covered so simultaneous flow of fluid from the inlets 21 and 24 into the chamber 11 is prevented at all times.

To further assure a tight seal in either limit position of the valve plug 25, the cup-shaped members 27 and 28 are provided with annular recesses 33 and 34 in the inner sides of their walls in which are received rubbery sealing rings 35 and 36 to engage the end of the sleeve 22 or 23 and thereby prevent leakage around the end of the sleeve. The rings 35 and 36 are retained tightly in position by means of the headed pins or plugs 37 and 38 which overlie the inner edges of the rings and are driven into recesses or bores 39 and 40 in the ends of the stem 26 of the valve member 25.

The valve member 25 is releasably retained in either of its limit positions by means of a ball detent structure. As shown in the drawing, the valve stem 26 has a ridge 41 of triangular cross-section extending around its mid-portion. The ridge 41 is engaged by a ball 42 which is urged toward the valve member 25 by means of a spring 43. The spring and the ball are received in a recess 44 in a threaded plug member 45 which is screwed into an internally threaded bore 46 in a boss 47 opposite the port 13. It will be understood that the boss 47 and the spring detent may be positioned in other angular relations to the port 13, if desired. The action of the detent is as follows. When the valve is in right-hand position as shown in the drawing, the ball engages the left-hand conical face of the rib 41 and thereby tends to resist movement of the valve member 25 to the left. If, however, the pressure at the port 21 decreases substantially, the pressure at the port 24 will urge the valve member 25 to the left thereby causing the ball 42 to be displaced outwardly as the rib 41 passes beneath it. As soon as the ball 42 comes into contact with the right-hand face of the rib, the ball will be urged inwardly and will force the valve member 25 to its limit position to the left thereby connecting the outlet port 13 to the port 24. Both sources of pressure will be momentarily cut off from communication with the bore or chamber 11 as the rib passes directly under the ball so that the fluid under pressure cannot flow simultaneously from both of the inlet ports into the chamber 11.

It will be apparent from the preceding description that a very simple type of shuttle valve has been produced in accordance with the present invention and that the number of parts of the valve is reduced substantially over the valves referred to above. The procedural steps involved in the manufacture and assembly of the valve are likewise simplified because the valve casing can be a casting or the like requiring only tapping operations to enable the couplings and the ball detent to be attached to the casing. The couplings 18 and 19 are essentially identical so that they both can be made in quantity with a single machine set up. These couplings and the sleeves mounted thereon serve the dual functions of guide means for the valve itself and also as elements of the sleeve valves so that additional guide means are not required to center and assure proper operation of the valve member in the casing.

It will be understood that the valve is susceptible to some modification in size, shape and proportions and therefore the form of valve described herein should be considered illustrative.

We claim:

1. A shuttle valve comprising a hollow valve casing having an internal wall forming an elongated valve chamber therein, tubular sleeves in said casing extending into opposite ends of said chamber and forming ports at opposite ends of said chamber, said sleeves being spaced radially from said internal wall, said casing also having another port at about its mid-portion communicating with said chamber, a valve member in said chamber having cup-shaped sleeve portions at its opposite ends, said sleeves engaging slidably inside said cup-shaped portions at all times and guiding said valve member for endwise movement in said casing, each of said cup-shaped portions and the sleeve slidably engaged within it forming a slide valve having a passage therethrough to be covered and uncovered by relative movement of said sleeves and cup-shaped portions upon endwise movement of said valve member in said casing.

2. A shuttle valve comprising a hollow valve casing having an internal wall defining an elongated valve chamber therein, first and second ports in said casing at opposite ends of said chamber and a third port in said casing communicating with about the middle of said chamber; sleeves at opposite ends of said casing extending into said chamber in spaced relation to said wall, said first and second ports communicating with said chamber through said sleeves, a valve member in said chamber having cup-shaped opposite ends telescopically receiving said sleeves, said cup-shaped ends having passages through their sides, to be covered and uncovered by said sleeves upon endwise movement of said valve member, the spacing between the passages at opposite ends of said valve member being such that the passages at one end of the valve member are covered before the passages at the other end are uncovered by lengthwise movement of the valve member.

3. A shuttle valve comprising a hollow valve casing having an internal wall defining an elongated valve chamber, a valve member in said valve chamber having sleeve elements at its opposite ends and a cross section smaller than the cross section of said chamber to permit flow of fluid between the valve member and the casing, first and second ports at opposite ends of said casing and a third port at about the middle of said casing, all of said ports communicating with said chamber, and sleeves at opposite ends of said casing telescoping within the sleeve elements at opposite ends of said valve member and forming therewith sleeve valves between said third port and each of said first and second ports, said sleeve valves each having at least one passage therein to be covered and uncovered by relative movement of said sleeves and sleeve elements, the spacing between the passages in the sleeve valves at opposite ends of said chamber being such that the passage in one sleeve valve is covered before the passage in the other sleeve valve is uncovered.

4. A shuttle valve comprising a tubular casing having an internal wall defining an elongated chamber, said casing having a centrally located port communicating with about the middle of said chamber, annular members secured in opposite ends of said casing and having sleeves thereon extending into said chamber in spaced relation to said internal wall, said annular members providing ports communicating with said chambers through said sleeves, an elongated valve member in said chamber having cup-shaped valve elements on its opposite ends at all times slidably receiving said sleeves to guide said valve member for reciprocation lengthwise of said chamber, said valve member being of smaller cross section than said chamber, a rubbery sealing member in the bottom of each cup-shaped member to engage the inner end of the corresponding sleeve to prevent leakage, each cup-shaped member having a passage through a wall thereof near its outer end, the spacing between the passages at the ends of the valve member and spacing between the inner ends of said sleeves being such that the passage in one cup-shaped member is covered before the passage in the other cup-shaped member is uncovered.

5. The shuttle valve set forth in claim 4 in which the spacing between the inner ends of said sleeves, and the spacing between the sealing members are such that when one of said passages is fully uncovered, the sleeve at the opposite end of the casing is in sealing engagement with said sealing member in the cup-shaped member receiving the last-mentioned sleeve.

6. The shuttle valve set forth in claim 5 comprising spring-biased detent means on said casing and said valve member to releasably retain said valve member at either limit of its reciprocating movement.

BENJAMIN N. ASHTON.
JOHN P. FRAIN.
EMERSON S. RAWDING.

References Cited in the file of this patent
UNITED STATES PATENTS

| Number | Name | Date |
| --- | --- | --- |
| 1,486,617 | Teegardin | Mar. 11, 1924 |
| 2,488,949 | Walsh | Nov. 22, 1949 |

FOREIGN PATENTS

| Number | Country | Date |
| --- | --- | --- |
| 349,520 | Great Britain | of 1931 |
| 882,423 | France | of 1943 |